(12) United States Patent
Soroka

(10) Patent No.: US 6,247,362 B1
(45) Date of Patent: Jun. 19, 2001

(54) HIGH TEMPERATURE HIGH PRESSURE PROBE SEAL

(75) Inventor: Valery Soroka, St. Charles, IL (US)

(73) Assignee: Magnetrol International, Downers Grove, IL (US)

( * ) Notice: Subject to any disclaimer, the term of this patent is extended or adjusted under 35 U.S.C. 154(b) by 0 days.

(21) Appl. No.: 09/386,487

(22) Filed: Aug. 27, 1999

(51) Int. Cl.⁷ .................................................. G01F 23/00
(52) U.S. Cl. ........................................ 73/290 V; 73/866.5
(58) Field of Search .............................. 73/290 V, 290 R, 73/866.5

(56) References Cited

U.S. PATENT DOCUMENTS

| | | | |
|---|---|---|---|
| 5,217,596 | * | 6/1993 | Indig et al. ........................... 204/435 |
| 5,661,251 | * | 8/1997 | Cummings et al. ................. 73/866.5 |
| 5,907,112 | * | 5/1999 | Queyquep ........................... 73/866.5 |
| 6,073,492 | * | 6/2000 | Rosselson et al. ................. 73/644 |

* cited by examiner

*Primary Examiner*—Richard A. Moller
(74) *Attorney, Agent, or Firm*—Wood, Phillips, VanSanten, Clark & Mortimer

(57) ABSTRACT

A high temperature, high pressure process seal is used with a process instrument having a control housing assembly with a 50 ohm control connection, and an elongate probe including a sensing element extending into a high temperature, high pressure process vessel. The probe has a process connection having a 50 ohm impedance. The seal operatively connects the probe to the control housing assembly. The seal includes an elongate cylindrical hollow seal adaptor receivable in an opening of the process vessel. An elongate shaft is coaxial with and extends through the adaptor and is adapted to connect the control connection to the process connection. A hard seal material between a select portion of the shaft and the adaptor is bonded to the shaft and the adaptor. Radial spacing between the shaft and the adaptor is greater at the select portion to provide a 50 ohm feedthrough from the control connection to the process connection.

19 Claims, 3 Drawing Sheets

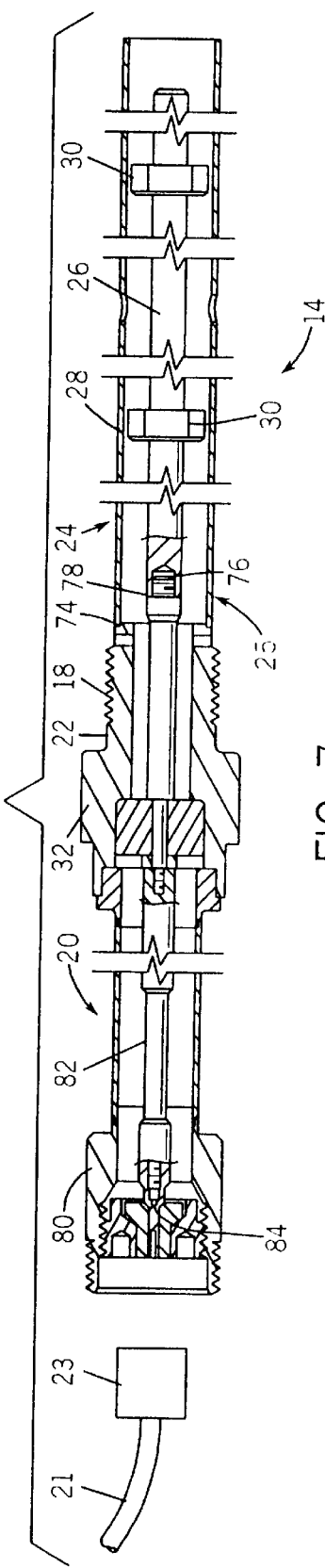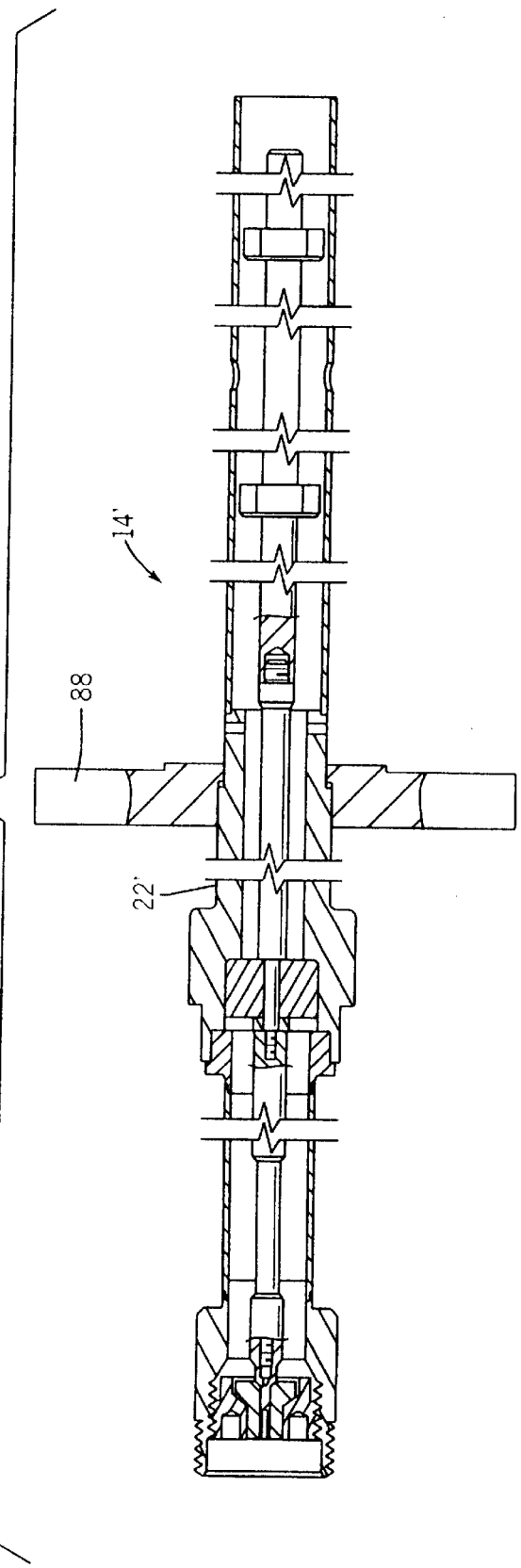

HIGH TEMPERATURE HIGH PRESSURE PROBE SEAL

FIELD OF THE INVENTION

This invention relates to process instruments and, more particularly, to a high temperature, high pressure seal for a probe assembly.

BACKGROUND OF THE INVENTION

Various instruments have found use for applications requiring level sensing of, for example, a liquid or bulk material in a vessel. One such instrument comprises a time domain reflectometry measurement instrument. With any such instrument it is desirable to ensure safety of both equipment and personnel.

A time domain reflectometry measurement instrument uses guided wave radar for sensing level. The instrument includes a control housing and a probe. The probe is typically mounted to a process vessel using a threaded fitting or a flange fitting. The probe comprises a high frequency transmission line which, when placed in the vessel, is used to measure level of fluid in the vessel. The probe is controlled by electronics in the control housing for determining level in the vessel.

Process instruments are sometimes used for sensing level of a pressurized vessel. Often, the contents of the vessel is at a high temperature. In order to seal the vessel at the probe connection, an appropriate seal must be included. The seal must be appropriate for the relatively high temperatures and pressures when used in such applications.

A time domain reflectometry instrument, as well as certain other process instruments, imparts a pulse signal on the probe and receives a return signal. The relationship between the pulse signal and the return signal is used to determine level. Typically, the control housing includes a 50 ohm control connection for the probe. If the probe has a different impedance, then a mismatch results. The mismatch can cause errors in level measurement. In applications where the probe has a 50 ohm impedance process connection, matching that of the control electrical connection, the design of the process seal can cause an impedance mismatch.

The present invention is intended to satisfy one or more of the problems discussed above.

SUMMARY OF THE INVENTION

In accordance with the invention, a process instrument includes a high temperature, high pressure probe seal.

Broadly, there is disclosed herein a high temperature, high pressure process seal for use with a process instrument having a control housing assembly with a control connection having a 50 ohm impedance, and a sensing element extending into a high temperature, high pressure process vessel. The sensing element has a process connection having a 50 ohm impedance. The seal operatively connects the sensing element to the control housing assembly. The seal includes an elongate cylindrical hollow seal adaptor receivable in an opening of the process vessel. An elongate shaft is coaxial with and extends through the adaptor and is adapted to connect the control connection to the process connection. A hard seal material between a select portion of the shaft and the adaptor is bonded to the shaft and the adaptor. Radial spacing between the shaft and the adaptor is greater at the select portion to provide a 50 ohm feed-through from the control connection to the process connection.

It is a feature of the invention that the shaft has a reduced diameter at the select portion. The adaptor has an inner cylindrical wall with an increased inner diameter at the select portion.

It is another feature of the invention that the seal material has a dielectric higher than air and the radial spacing is determined by the dielectric of the seal material.

The seal material may comprise a low loss and low dielectric glass or ceramic material.

It is another feature of the invention that the adaptor and shaft are made of Inconel.

There is disclosed in accordance with another aspect of the invention a high temperature, high pressure process seal probe for use with a process instrument, having a control assembly with a control connection having a 50 ohm impedance, and for extending into a high temperature, high pressure process vessel. The probe includes a sensing element for extending into the process vessel and having a process connection having a 50 ohm impedance. An elongate cylindrical hollow seal adaptor is receivable in an opening of the process vessel and is connected to the control housing assembly. An elongate shaft is coaxial with and extends through the adaptor and is connected at an inner end to the transmission line and at an outer end to the control connection. A hard seal material between a select portion of the shaft and the adaptor is bonded to the shaft and the adaptor. Radial spacing between the shaft and the adaptor is greater at the select portion to provide a 50 ohm feed-through from the control connection to the process connection.

Further features and advantages of the invention will be readily apparent from the specification and from the drawings.

BRIEF DESCRIPTION OF THE DRAWING

FIG. 1 is a side elevation view of a process instrument with a probe assembly including a high temperature, high pressure process seal in accordance with the invention;

FIG. 2 is a sectional view of the probe assembly of FIG. 1 connected to an extension housing;

FIG. 3 is a sectional view of the process seal of the probe assembly of FIG. 2;

FIG. 4 is a side elevation view of an adaptor of the process seal of FIG. 3;

FIG. 5 is a sectional view taken along the line 5—5 of FIG. 4;

FIG. 6 is a side view of a shaft for the process seal of FIG. 3; and

FIG. 7 is a sectional view, similar to that of FIG. 2, for a probe assembly having a flange connection.

DETAILED DESCRIPTION OF THE INVENTION

Referring to FIG. 1, a process instrument 10 uses micropower impulse radar (MIR) in conjunction with equivalent time sampling (ETS) and ultra-wide band (UWB) transceivers for measuring level. Particularly, the instrument 10 uses guided wave radar for sensing level. While the embodiment described herein relates to an MIR level sensing apparatus, the teachings of the invention may be used with other types of process instruments for measuring various process parameters.

The process instrument 10 includes a control housing assembly 12, a probe assembly 14, and a connector 16 for connecting the probe assembly 14 to the housing assembly 12. The probe assembly 14 is typically mounted to a process vessel V using a threaded fitting 18. The control housing 12 and connector 16 may be as generally described in Mulrooney et al., U.S. patent application Ser. No. 09/094,142, filed Jun. 9, 1998, the specification of which is hereby incorporated by reference herein. Moreover, the circuitry contained in the housing 12 may be as generally described in Carsella et al., U.S. patent application Ser. No. 09/336, 194, filed Jun. 18, 1999, the specification of which is hereby incorporated by reference herein. As described therein, a probe comprises a high frequency transmission line which, when placed in a fluid, can be used to measure level of the fluid. Thus, the probe assembly 14 is controlled by electronic circuitry in the housing assembly 12 for determining level in the vessel V.

Figure 1:
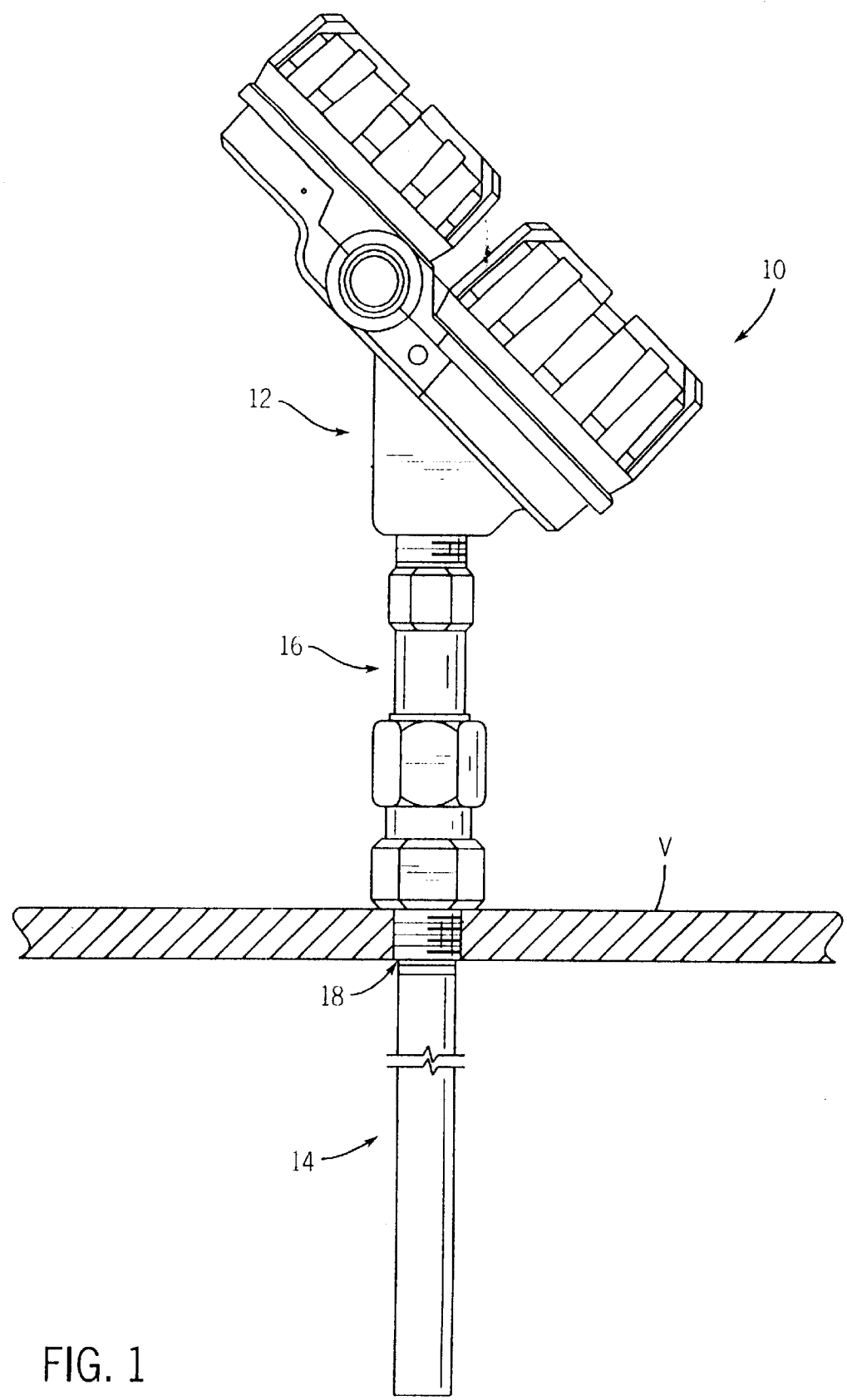

Referring to FIG. 2, the probe assembly 14 is shown in section. In the embodiment of FIG. 2, the probe assembly 14 is shown connected to a heat extender 20 which in turn would be connected to the connector 16 of FIG. 1.

In accordance with the invention, the probe assembly 14 uses a process seal for industrial high temperature and high pressure applications. The seal provides a 50 ohm feed-through electronic connector and mechanical process seal.

The probe assembly 14 comprises a process seal 22 and a probe 24. In the illustrated embodiment of the invention, the probe 24 includes an elongate rod 26 received in a hollow cylindrical tube 28. The rod 26 acts as a signal line while the tube 28 acts as a ground line. The rod 26 is maintained centered in the tube 28 using insulating spacers 30 in FIG. 2. The length of the rod 26 and the cylindrical tube 28 depends on the height of the vessel and the level range of material to be sensed.

As is apparent, the probe 24 is a sensor element that could utilize various other designs, such as twin rod or single conductor designs. The invention relates more particularly to the use of the process seal 22 as part of a probe assembly. While this application describes the probe 24 as a transmission line for an MIR level sensing apparatus, the probe 24 could be configured as an antenna when used as with a through the air level sensing instrument, as is known.

The control circuitry in the housing assembly 12 typically includes a coaxial cable 21 having a connector 23 to provide a 50 ohm electrical control connection. The probe 24 has a process connection 25 also having an impedance of approximately 50 ohms. The probe assembly 20 should advantageously provide a smooth impedance transition from the control connection 23 to the process connection 25. In accordance with the invention, the seal assembly 22 is adapted to provide a 50 ohm feed-through connection from the control connection 23 to the process connection 25 of the probe 24.

Figure 3:
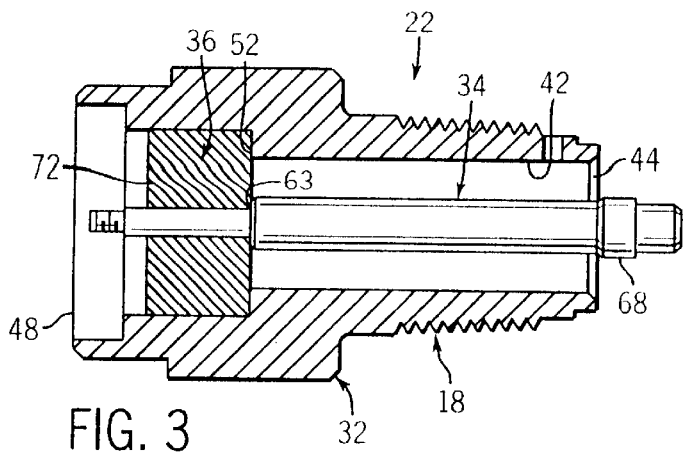

Referring to FIG. 3, the seal assembly 22 is illustrated. The seal assembly 22 includes an adaptor 32, an elongate shaft 34, and a seal 36.

Figure 4:
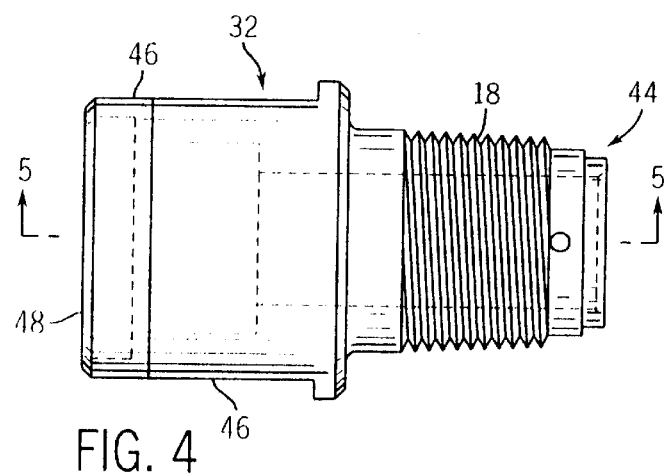
Figure 5:
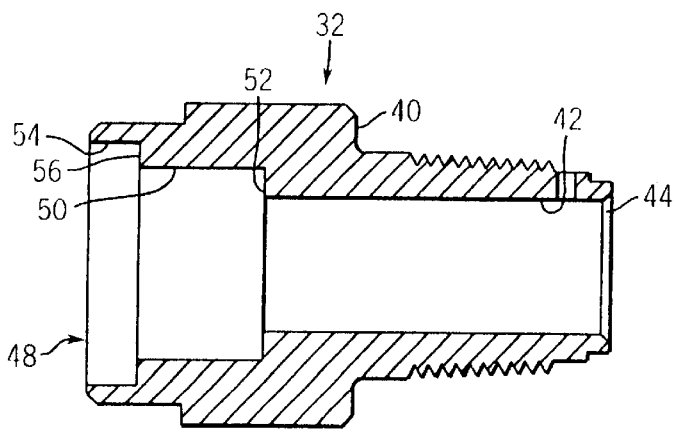

Referring also to FIGS. 4 and 5, the adaptor 32 includes a generally cylindrical body 40 having an inner through opening defined by inner wall 42. The adaptor 32 includes the threaded outer wall 18 at an inner end 44. As used herein, the term "inner" is used to refer to a direction towards a process vessel which receives the probe assembly 14, while the term "outer" refers to an opposite direction. Flats 46 are provided proximate an outer end 48 for engagement by a wrench or the like for threading the adaptor 32 into a process vessel.

The through opening 42 includes a first counterbore 50 proximate the outer end 48 to define a first shoulder 52. A second counterbore 54 is outwardly of the first counterbore 50 to define a second shoulder 56. In accordance with the invention, the adaptor 32 is made of Inconel X750.

Figure 6:
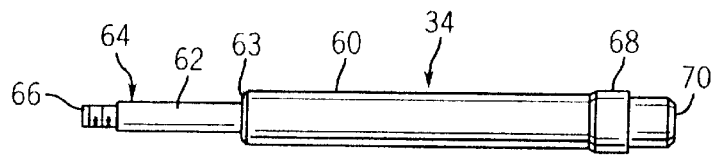

Referring to FIG. 6, the shaft 34 is also be constructed of Inconel X750. The shaft 34 comprises a generally cylindrical body 60 having a narrower diameter neck portion 62 proximate an outer end 64 to define an intermediate shoulder 63. The distal end of the neck portion 62 is threaded as at 66. An annular collar 68 surrounds the body 60 proximate an inner end 70. A length of the body 60 between the shoulder 63 and the collar 68 corresponds to length of the adaptor 32 between the first shoulder 52 and the inner end 44, as shown in FIG. 3.

To construct the seal assembly 22, the shaft 34 is positioned coaxially in the adaptor through opening 42 using an appropriate fixture (not shown). The seal material 36 is then poured from the outer end 48 to form an annular ring 72 resting on the adaptor first shoulder 52 and the rod shoulder 63. As is apparent, the fixture prevents the seal material 36 from flowing further inwardly. Upon hardening, the seal material 36 provides a hard seal which is bonded to the metal of the adaptor 32 and the rod 34.

The seal material 36 comprises a low loss, low dielectric glass or ceramic material. One suitable material is identified as L21 sold by Hermetic Seal Corporation. The seal material 36 is capable of withstanding process conditions up to 750° F. at 2000 psi. The seal material 36 provides a hermetic seal in the range of temperatures 70–750° F. with less than $10^{-8}$ cc of helium/second leak rate. The seal 36 is capable of enduring immersions in liquid nitrogen at –400 to –447° F. for forty-two hours. The seal assembly 22 is corrosion resistant. Mechanical strength is provided by the rod 34 which is capable of supporting, for example, up to 500 pounds weight, enabling it to support probes up to twenty feet long. Moreover, the seal assembly 22 provides a 50 ohm feed-through electronic connector. Particularly, the seal material 36 has a greater dielectric than air. The radial spacing between the rod 34 and the adaptor 32 is greater in the longitudinal position where the seal material 36 is located. The radial spacing is less proximate the inner end 44. The increased radial spacing between the rod 34 and the adaptor 22 in the area surrounded by the higher dielectric seal material 36 maintains a 50 ohm impedance throughout length of the seal assembly 22.

The use of the 50 ohm feed-through connector provides improved performance for the MIR level instrument in which variations in impedance can affect level measurement. While the seal assembly 22 is described herein relative to an MIR level sensing instrument, the seal assembly 22 could be used in other types of process instruments having similar impedance characteristics, such as pulse type transmitters or through-the-air type transmitters using a probe as an antenna.

The use of Inconel X750, which has a low coefficient of thermal expansions, for the adapter 32 and the rod 34 minimizes fatigue malfunctions. Nevertheless, other material could be used, as is apparent.

Referring to FIG. 2, the probe tube 28 is secured to the adaptor 32 as by welding at 74. Likewise, the shaft inner end extends into a counterbore 76 of the probe rod 26 at the process connection 25 and may be welded as at 78. Normally, the shaft threaded end 66 is secured to the control housing assembly control connection. In the illustrated embodiment, the threaded end is secured to the heat extension 20.

The heat extension 20 is of conventional construction and includes a hollow tube 80 with a central rod 82. A female electrical connector 84 is connected to an outer end of the rod 82 for receiving the 50 ohm electrical male connector 23, or the connector 16 of FIG. 1. The heat extension 20 extends the mounting point of the control housing 12 away from the process vessel, which reduces heat which might be transmitted to the control housing 12 through conduction.

Referring to FIG. 7, a probe assembly 14' according to an alternative embodiment of the invention is illustrated. The probe assembly 14' of FIG. 7 differs from the probe assembly 14 of FIG. 2 in that a process seal assembly 22' includes a flange 88, rather than a threaded outer wall, for connecting to an opening of a process vessel surrounded by a flange.

Thus, in accordance with the invention, there is illustrated a 50 ohm feed-through electronic connector and mechanical process seal for high temperature and high pressure applications.

I claim:

1. A high temperature high pressure process seal for use with a process instrument having a control housing assembly with a control connection having a 50 ohm impedance and a sensing element extending into a high temperature high pressure process vessel, the sensing element including a process connection having a 50 ohm impedance, the seal for operatively connecting the sensing element to the control housing assembly and comprising:

an elongate cylindrical hollow seal adapter receivable in an opening of the process vessel;

an elongate shaft coaxial with and extending through the adapter and adapted to connect the control connection to the process connection; and a hard seal material between a select portion of the shaft and the adapter and bonded to the shaft and the adapter, radial spacing between the shaft and the adapter being greater at the select portion to provide a 50 ohm feed-through from the control connection to the process connection.

2. The high temperature high pressure seal of claim 1 wherein the shaft has a reduced diameter at the select portion.

3. The high temperature high pressure seal of claim 1 wherein the adapter has an inner cylindrical wall with an increased inner diameter at the select portion.

4. The high temperature high pressure seal of claim 1 wherein the seal material has a dielectric higher than air and the radial spacing is determined by the dielectric of the seal material.

5. The high temperature high pressure seal of claim 1 wherein the seal material comprises a low loss and low dielectric glass material.

6. The high temperature high pressure seal of claim 1 wherein the seal material comprises a low loss and low dielectric ceramic material.

7. The high temperature high pressure seal of claim 1 wherein the adapter is made of Inconel.

8. The high temperature high pressure seal of claim 1 wherein the shaft is made of Inconel.

9. A high temperature high pressure process seal probe for use with a process instrument having a control housing assembly with a 50 ohm control connection and for extending into a high temperature high pressure process vessel, comprising:

a sensing element for extending into the process vessel and having a process connection with a 50 ohm impedance;

an elongate cylindrical hollow seal adapter receivable in an opening of the process vessel and connectable to the control housing assembly;

an elongate shaft coaxial with and extending through the adapter and connected at an inner end to the transmission line and at an outer end to the control connection; and a hard seal material between a select portion of the shaft and the adapter and bonded to the shaft and the adapter, radial spacing between the shaft and the adapter being greater at the select portion to provide a 50 ohm feed-through from the control connection to the process connection.

10. The high temperature high pressure process seal probe of claim 9 wherein the shaft has a reduced diameter at the select portion.

11. The high temperature high pressure process seal probe of claim 9 wherein the adapter has an inner cylindrical wall with an increased inner diameter at the select portion.

12. The high temperature high pressure process seal probe of claim 9 wherein the seal material has a dielectric higher than air and the radial spacing is determined by the dielectric of the seal material.

13. The high temperature high pressure process seal probe of claim 9 wherein the seal material comprises a low loss and low dielectric glass material.

14. The high temperature high pressure process seal probe of claim 9 wherein the seal material comprises a low loss and low dielectric ceramic material.

15. The high temperature high pressure process seat probe of claim 9 wherein the adapter is made of Inconel.

16. The high temperature high pressure process seal probe of claim 9 wherein the shaft is made of Inconel.

17. The high temperature high pressure process seal probe of claim 9 wherein the tube is welded to the adapter.

18. The high temperature high pressure process seal probe of claim 9 wherein the sensing element comprises a transmission line.

19. The high temperature high pressure process seal probe of claim 9 wherein the sensing element comprises an antenna.

\* \* \* \* \*